April 9, 1929.  C. R. ALDEN  1,708,491
METHOD OF FINISHING BALL BEARINGS
Filed July 17, 1926
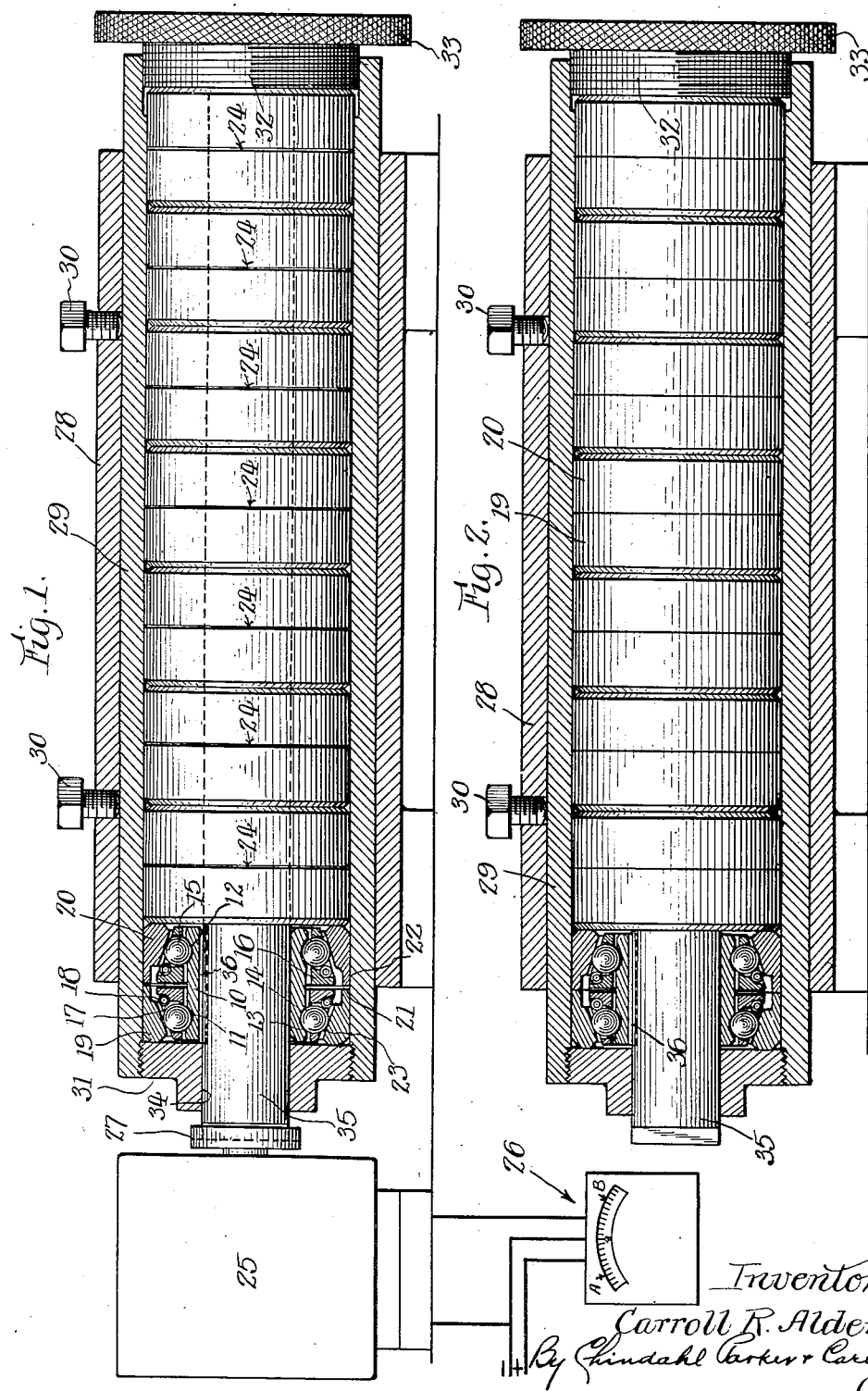

Patented Apr. 9, 1929.

1,708,491

UNITED STATES PATENT OFFICE.

CARROLL R. ALDEN, OF DETROIT, MICHIGAN, ASSIGNOR TO EX-CELL-O TOOL & MANUFACTURING CO., OF DETROIT, MICHIGAN, A CORPORATION OF MICHIGAN.

METHOD OF FINISHING BALL BEARINGS.

Application filed July 17, 1926. Serial No. 123,051.

This invention relates generally to the manufacture of ball bearings. It has particular reference to a process for producing a precision bearing by running the bearing prior to completion and during the final operation of adjusting the parts together.

The invention has particular application to bearings used in high speed spindles in which great accuracy is desired, such as grinding spindles. Both lateral and end play are objectionable in all bearings, but particularly so in high speed spindle bearings. Ordinarily, bearings when first made and fitted together, have high spots on the races and also on the balls; and the balls may be of varying diameters. The first period of use of such bearings soon wears down the high spots and the initial tight fit becomes a loose fit. Undesirable play is thus introduced. It is quite customary to provide adjustable constructions to take up this play, thus to change the loose fit again to a tight fit. Such an adjustment not only displaces the track already formed by the previous running of the bearing, but can not be made with accuracy or to any predetermined degree of pressure. The parts therefore are subject to being so adjusted or tightened that the material of the races is distorted by too great an adjusting pressure. Under these conditions, the balls, acting on the strained metal cause flaking or pitting of the metal of the race while the flakes act to further damage the bearing. The balls, running in such pitted tracks produce bearings known as "singers." Usually this condition soon ruins the bearing, but sometimes the bearing corrects itself by smoothing out the pitted track creating still more looseness. This requires further adjustment subject to the same objections. Thus, for adjusting such bearings to eliminate play, there is always danger of ruining the bearing and it is never certain as to what conditions or permanency will result from the adjustment.

The present invention aims to overcome these objections to prior art bearings by wearing down or running-in the bearings prior to the completion of the manufacturing process.

One object of the invention is to produce mated parts which operate smoothly together without looseness of fit, and which are already so worn into place, each part relative to the other, that further wear is negligible and adjustment unnecessary.

Still another object is to provide an assembly process for interchangeable bearing parts so that the parts are worn-in and adjusted simultaneously into a predetermined relationship.

Another object is to provide suitable means for wearing down and adjusting the bearings under standard conditions.

In the accompanying drawings there is illustrated a bearing which is treated by the process hereinafter described, and apparatus by which a plurality of similar bearings may be simultaneously treated to produce the desired result.

In the drawings,

Figure 1 illustrates a casing containing a plurality of bearings in process driven by a motor associated with an indicating wattmeter.

Fig. 2 illustrates the condition of the bearings after the running-in process is completed and prior to the removal of the bearings from the casing.

Although the invention is described with reference to a particular style of construction of bearing, it is to be understood that the process is not limited to the form of bearing shown in the drawings, nor is the apparatus illustrated to be considered as the only apparatus by means of which the process can be carried out. From the following description of the invention, it will be clear to those skilled in the art that the invention is susceptible to application to many types of bearings in which the races may be adjusted axially toward each other and that the process is capable of being carried out by other means. Therefore, the drawings and the following description are not to be considered as limitations of the invention short of its scope as expressed in the appended claims.

The invention is herein explained by reference to a bearing having two sets of balls, each with three races. The particular construction illustrated is representative of those bearings in which the balls are caused to spin. This is a desirable feature since all points on each ball are equally subjected to rolling contact and the ball is thus maintained truly spherical. A brief description of the bearing will suffice.

The bearing comprises a right and left hand section each having an inner and outer race, one section duplicating the other. The inner race member of each section is a common structure designated 10. Two grooves 11 and 12 are formed in the common member 10, each groove presenting two differently curved contact surfaces or raceways 13 and 14 to the balls 15 of the bearings. The balls 15 are arranged in two annular series, each of which is held in a retainer 16 of such character that each series of balls can be maintained in its annular form upon removal from the bearing. This eliminates the danger of the balls of one series being mixed with other balls. The particular retainer herein illustrated comprises generally an annular holder recessed to provide ball cages 17 and an elastic flexible member, in the form of a band of coiled spring wire 18, spanning each ball cage to hold a ball therein. The elasticity and flexibility of the member 18 permits each ball-carrying retainer to be removably positioned on the member 10. Each ball may move outwardly in its cage against the spring 18 thus to increase the diameter of the annular series of balls as it slips over the end of the member 10 in entering or leaving the grooves 11 or 12.

Each series of balls is provided with an annulus forming the outer race of the bearing. These are designated 19 and 20 and have ground inner end faces 21 and 22 respectively. Each such race has a conical surface 23 which contacts the annular series of balls, the two cones of the adjacent members extending in opposite directions. When the bearing is completed the ground faces 21 and 22 are made to abut each other and the three race surfaces 23, 13 and 14 provide a precise annular channel for a series of uniformly sized balls.

By means of the present invention this precise relation and the uniform sizing of the balls are produced simultaneously with the gradual adjustment of the bearing parts into their final predetermined relationship. With the particular bearing illustrated herein this occurs when the surfaces 21, 22 abut each other as hereinafter more fully set forth. The bearing is further made so that its parts can be disassembled and again reassembled without interfering with the desired relationship.

In a bearing such as that described a theoretically curved or conical race will present to a true sphere but a single point of contact. This point will bear all the pressure between the race and the balls, and mathematically, this is an infinite pressure. Practically, however, either by design or as a result of operation such bearings have a track formed therein, conforming closely to the radius of the ball. The width of the track may vary, and the wider the track the less the unit pressure of contact. While width in the track is therefore desirable to reduce the pressure, too great a width of the track must be guarded against as in high speed bearings excessive width induces heating.

In manufacturing the described bearing according to the present invention, the parts are mechanically formed to design, that is, one race is conical and the other two are curved to the required degree. Balls are provided of the desired size. The bearing parts are assembled to a tight fit, but the parts are first so designed that the ground surfaces 21 and 22, at said tight fit, have a clearance between them, indicated at 24, which amounts to approximately three to five thousandths of an inch for a bearing about two inches in diameter. The amount of this clearance will vary widely with the form of the races and may, in cases where the radius of the race at the point of contact with the ball closely approximates the radius of the ball, be a matter of only one or two ten-thousandths of an inch. The parts, thus assembled with the space between the two outer races, are operated with pressure on the separated races in order to wear the parts into an interfitting relation. This wearing-in process can be accomplished rapidly by operating the bearing in the presence of an abradant, which is preferably a mild abradant or polishing agent, such as jeweler's rouge suspended in a suitable carrier such as oil. The following is an example of a satisfactory abradant used for the process:

Finely divided iron oxide_____ 20 oz.
Light mineral oil_____ 1 qt.

The finely divided iron oxide, commercially known as jeweler's rouge is beaten into the oil, which is preferably a light oil known as spindle oil, to form a smooth mixture. This mixture is subsequently filtered or strained to remove lumps or foreign matter.

As the races and balls wear down under action of the pressure and the abradant, the pressure is maintained by squeezing the two outer races 19 and 20 together. When they meet the parts will have been sufficiently worn-in, any high spots will have been removed, and the bearing parts will fit with a pressure comparable to the working pressure maintained on the two outer races during the running-in process. If the abradant is present after the outer races abut each other, and the wearing-in action is continued, the pressure between the parts will gradually decrease. The abrasive action thus can be continued until the bearing reaches the desired state for its particular use. At this point the bearing is carefully washed out to remove the abradant, the parts being separated if desired, cleaned, marked as mated, and reassembled to provide the finished product. If the bearing is not to be used immediately, grease is usually applied as a rust preventive.

Means is provided for determining the amount of pressure applied during the process and for determining the condition of the bearing after the outer races have met. This is done by measuring the power required to drive the bearing as it is being worn-in in the presence of the abradant. In the present instance, the bearing is shown as being driven by an electric motor 25 to which is connected an indicating wattmeter 26.

For commercial practice a number of bearings are similarly treated at the same time and by the same apparatus. A convenient mounting and pressure producing means for accomplishing this is shown in the drawings. The motor 25, connected to an indicating wattmeter 26, is provided with a coupling 27. A bracket member 28 is mounted in alinement with the motor coupling 27. An elongated casing 29 is adapted to be removably positioned in the bracket and held therein by the provision of set screws 30. The pressure producing means preferably comprises parts movable endwise of the casing toward each other. In the present instance, these parts, in the form of the closures 31 and 32, are screw-threaded into the ends of the casing.

Obviously either or both of the closures may be tightened to produce the desired pressure but the preferred method is to increase the pressure equally from both ends eliminating any chance inequality of pressure in the casing which might be caused by friction between the outer races and the casing.

The closure 31 is arranged to be tightened in any suitable manner as by forming, at its outer end, a nut or the like. The other closure 32 is arranged for manual adjustment during the process, and for this purpose is provided with an enlarged knurled head 33, so that manual turning of it as a nut is readily accomplished. The casing closure 31 has a central opening 34 to permit the end of a shaft 35 to extend therethrough for coupling of the motor. The shaft 35 is mounted in the casing by means of the bearings to be operated upon. The shaft has a key 36 thereon over which the inner race members 10 of the bearings can be splined, each being thus free to slide along the shaft and to be positively driven. A plurality of bearings assembled with the clearance space 24 between the two outer races are mounted on the shaft 35, the outer races fitting in the casing snugly but slidably. In this relation the inner members may be said to be floating with respect to the outer recess. Although, in the present instance, a number of bearings are thus mounted together in a single casing, it will be understood that one or any number may be thus treated. During the process of mounting the bearings upon the shaft 35 the abrasive mixture is added to the casing so that when the end closure or nut 32 is turned up to compact all the bearings loosely together the abrasive mixture will substantially fill the voids in the interior of the casing. The force of the clamping action created by turning either or both of the closures 31 and 32, is transmitted from one outer race to the other outer race of a single bearing through its two series of balls. Movement of the outer races in the casing carries along the corresponding inner race member 10. The casing is filled with the desired abrasive material and the bearings are rotated by the motor at the desired speed. The wattmeter will indicate a value represented by A, this corresponding to the power required to overcome friction in the motor and the bearings as run with the abrasive. It will be understood that at this point the bearings are loosely compacted together. The hand nut is then tightened to put all the bearings under the same pressure. The desired degree of pressure is determined from the wattmeter reading, and is dictated by experience with the particular conditions say, at B. As running continues the parts wear-in together reducing the high spots, wearing the balls to a uniform diameter, and wearing tracks in the races. This action tends to produce looseness in the bearings and lowers the power required to drive them. Under these conditions the wattmeter reading moves from B toward A. The operator, however, turns one or both of the closures 31 or 32 to keep the meter reading substantially near the value B which represents the desired working pressure. When the nut no longer can be turned the operator knows that the bearings each have their outer races in contact and that the limiting position of adjustment has been reached. Further running in the presence of the abrasive will lower the wattmeter reading, because the wearing of the track still continues. However, when the meter indicates the desired degree of free-running, somewhere between A and B, the bearings are removed, cleaned of the abradant, the parts marked with identification matter to signify that they are mated, suitably greased with a non-abrasive rust preventing lubricant, assembled and packed for shipment.

Although the bearing herein described to illustrate the invention is a dual structure, it is to be understood that each outer race may be considered as an abutment for the other race, and its function as an abutment is entirely independent of its function as a race. Accordingly, each section of the bearing unit described may be considered as two independent bearings, the parts of which are moved into a predetermined relation.

A particular advantage of the present process is the fact that bearings so treated, being tight and running smoothly, may be operated at very high speeds and produce less heat than other less accurately fitted bearings; and the cooler condition of the bearing tends further to maintain the original accuracy of the interfitting and mated parts. The fact that the bearing is finally adjusted after a period of considerable use and wear adds to the desirable qualities thereof, contributing to its smooth running and to its durability.

Thus, it will be seen that the present invention provides a process which produces precise and durable ball or anti-friction bearings, in which a single annular series of balls or anti-friction members and its races are definitely positioned with respect to each other only after the parts have been worn-in together and mated.

Attention is directed to the drawings wherein it may be seen that when the bearings are locked in the casing, a space is provided between the inner race of any one bearing and the inner races of the adjacent bearings. This is to prevent any possible mechanical contact of one inner race with another which would prematurely relieve the pressure from the outer races thus stopping the developing action before completion. It is possible, in some instances, that the inner races might be excessively wide in which event a spacer or shim would be inserted between the outer races of adjacent bearings to provide the desired spacing between the inner races.

I claim as my invention:

1. In the manufacture of a ball bearing having two series of balls, a common member providing a race for each series, and two separate race members adapted to abut each other in the finished bearing, the process of forming a precision bearing which comprises first forming the parts to prevent perfect assembly whereby to leave a clearance space between the two separate race members, clamping said separated race members together so as to move them in a direction to abut each other, the clamping pressure being transmitted, in order, from one race through one series of balls, through the common race-forming member, through the other series of balls, and to the other race, the common member being in floating relation with respect to the clamped separated race members, relatively rotating the floating member and the separated races in the presence of an abradant within the bearing whereby to wear down the balls and races, maintaining the pressure on the races below a predetermined limit, indicating the driving power to detect a change in pressure, and continuing the wearing-in action until said separated races move into abutting contact with a predetermined degree of pressure between them.

2. In the manufacture of a ball bearing having two series of balls, a common member providing a race for each series, and two separate race members adapted to abut each other in the finished bearing, the process of forming a precision bearing which comprises first forming the parts to prevent perfect assembly whereby to leave a clearance space between the two separate race members, clamping said separated race members together so as to move them into a direction to abut each other, the clamping pressure being transmitted, in order, from one race, through one series of balls, through the common race-forming member, through the other series of balls, and to the other race, the common member being in floating relation with respect to the clamped separated race members, relatively rotating the floating member and the separated races in the presence of an abradant within the bearing whereby to wear down the balls and races, and maintaining the pressure on the races below a predetermined limit.

3. In a process of manufacturing ball bearings designed to have a predetermined relation of the balls and the races, the steps of running the bearing in the presence of an abradant, producing and maintaining a working pressure on the parts of the bearing in a direction to move them into the predetermined relation, and continuing the running of the bearing in the presence of an abradant after the parts have reached the predetermined relation and until the working pressure employed is reduced to a predetermined degree.

4. In a process of manufacturing ball bearings designed to have a predetermined relation of the balls and the races, the steps of running the bearing in the presence of an abradant, and producing and maintaining a working pressure on the parts of the bearing in a direction to move them into the predetermined relation.

5. In a ball bearing manufacturing process the step of running a bearing in the presence of an abradant during the step of finally adjusting the parts of the bearing to a predetermined relation.

6. In a ball bearing manufacturing process, the steps of running a bearing under a working pressure in the presence of an abradant, and simultaneously moving the parts of the bearing to a limiting position by maintaining the pressure as the bearing parts are worn in.

7. In a ball bearing manufacturing process, the steps of running a bearing under a working pressure in the presence of an abradant, simultaneously moving the parts of the bearing to a limiting position by maintaining the pressure as the bearing is worn in, and continuing the running of the bearing in the presence of an abradant until a predetermined looseness exists in the bearing.

8. In a ball bearing manufacturing process the step of running a bearing in the presence of an abradant during the step of finally adjusting the parts of the bearing to a predetermined relation, and maintaining pressure on the bearing parts below a predetermined limiting value.

9. A process for finishing ball bearing races comprising, adjusting the ball bearing races relatively to each other to create a pressure upon the balls positioned therebetween and operating the races and balls in the presence of an abradant until a predetermined reduction in the initial pressure occurs.

10. A process for finishing an anti-friction bearing consisting of a pair of axially adjustable races and intermediate anti-friction members, which comprises adjusting the races to a predetermined operative relation and effecting relative movement between the races with the races and anti-friction members in the presence of an abradant to produce a uniform interfitting relation between the races and anti-friction members.

11. A method for finishing ball bearings which comprises operating the bearing in the presence of an abradant to wear in the parts.

12. A process for finishing ball bearings which comprises adjusting the parts of the bearing to a predetermined operative relation and operating the bearing in the presence of an abrasive material suspended in a liquid.

13. A process for finishing ball bearings which comprises adjusting the parts of the bearings to a predetermined operative relation and operating the bearing in the presence of a finely divided abrasive material suspended in oil.

14. A process for finishing ball bearing races which comprises operating the races with a plurality of balls therebetween and in the presence of an abradant.

In testimony whereof, I have hereunto affixed my signature.

CARROLL R. ALDEN.